No. 891,608. PATENTED JUNE 23, 1908.
W. E. DRAPER & F. W. STROHM.
ENSILAGE DISTRIBUTER.
APPLICATION FILED NOV. 16, 1907.
3 SHEETS—SHEET 1.
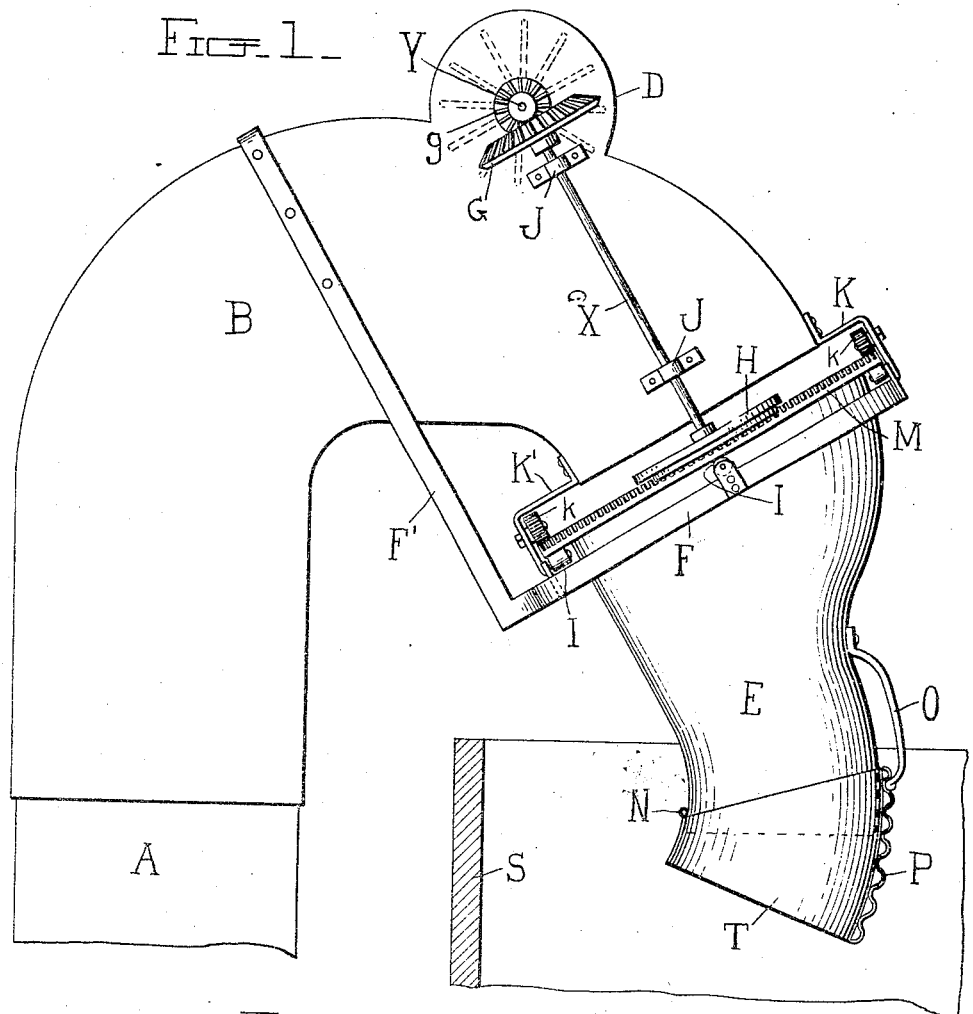
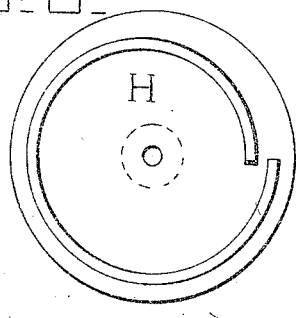
Witnesses
L. B. James
M. T. Miller
Inventors
W.E. Draper &
F.W. Strohm
By Chandler & Chandler
Attorneys No. 891,608. PATENTED JUNE 23, 1908.
W. E. DRAPER & F. W. STROHM.
ENSILAGE DISTRIBUTER.
APPLICATION FILED NOV. 16, 1907.
3 SHEETS—SHEET 2.
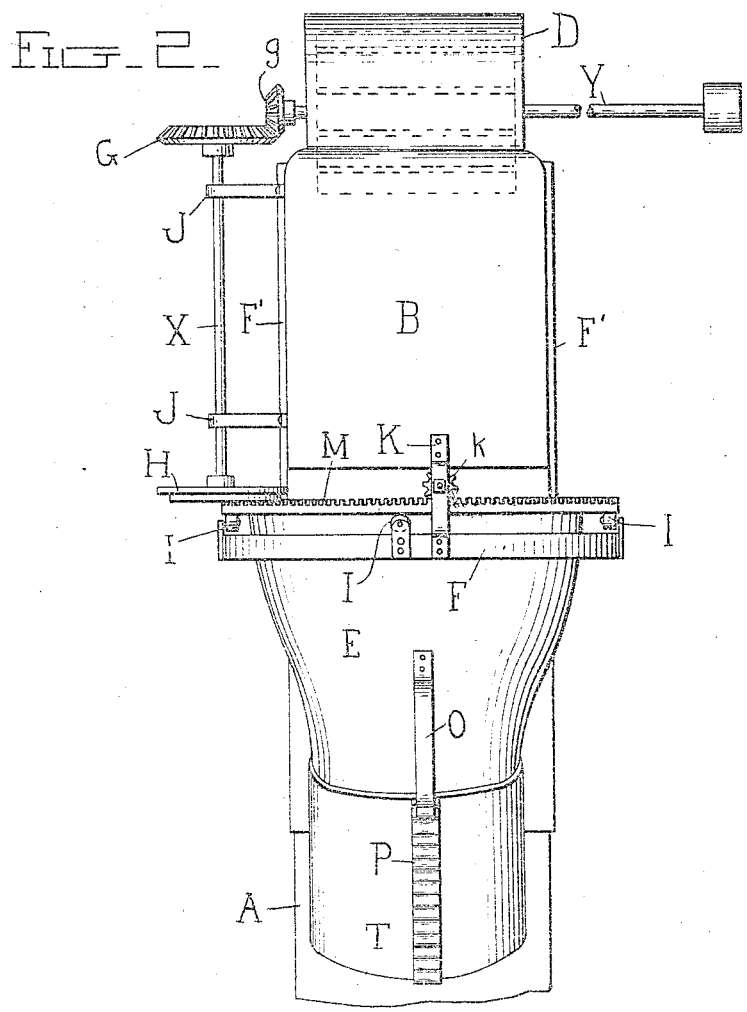
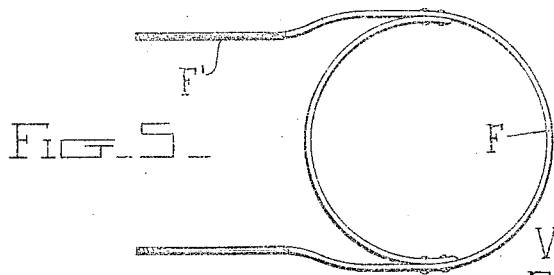
Witnesses
L. B. James
M. J. Miller
Inventors
W. E. Draper
F. W. Strohm
By Chandler & Chandler
Attorneys No. 891,608. PATENTED JUNE 23, 1908.
W. E. DRAPER & F. W. STROHM.
ENSILAGE DISTRIBUTER.
APPLICATION FILED NOV. 16, 1907.
3 SHEETS—SHEET 3.
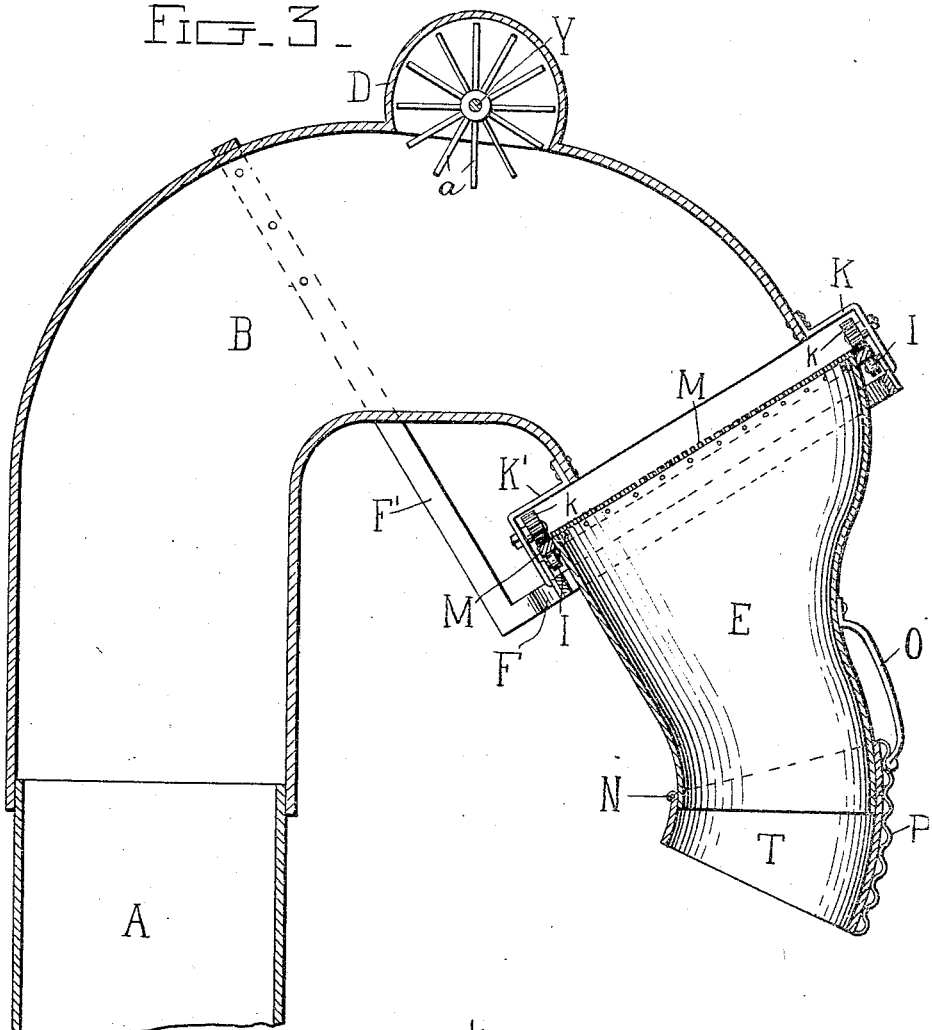
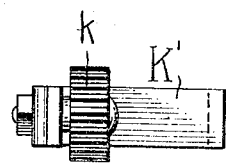
Witnesses
L. B. James
M. T. Miller
Inventors
W. E. Draper &
F. W. Strohm
By
Chandler & Chandler
Attorneys

UNITED STATES PATENT OFFICE.

WILLIAM E. DRAPER AND FRANK W. STROHM, OF WAYNE, ILLINOIS.

ENSILAGE-DISTRIBUTER.

No. 891,608.   Specification of Letters Patent.   Patented June 23, 1908.

Application filed November 16, 1907. Serial No. 402,551.

*To all whom it may concern:*

Be it known that we, WILLIAM E. DRAPER and FRANK W. STROHM, citizens of the United States, residing at Wayne, in the county of Dupage, State of Illinois, have invented certain new and useful Improvements in Ensilage-Distributers; and we do hereby declare the following to be a full, clear, and exact description of the invention, such as will enable others skilled in the art to which it appertains to make and use the same.

This invention relates to a new and useful automatically operated ensilage distributer.

The object of our invention is to provide a distributing nozzle and spout adapted to secure to an ensilage cutter of the blower type the invention being intended to be used in feeding to and distributing ensilage within a silo, the nozzle being rotatably actuated as will be described more fully hereinafter.

In the accompanying drawings we have shown in Figure 1 a side elevation of an ensilage distributer showing it in connection with a silo in section. Fig. 2 is a front elevation of the structure shown in Fig. 1. Fig. 3 is a vertical section through the entire upper end portion of the distributer. Fig. 4 is an enlarged detail of one of the pinions and brackets. Fig. 5 is a detail view of the supporting collar. Fig. 6 is a bottom view of the disk spiral.

As has been set forth the object of our invention is to provide an ensilage distributer having a rotating spout automatically actuated by the air blast and ensilage delivered through the spout. By these means the ensilage may be delivered at any desired point within the silo especially so as we provide a distributing nozzle so that the ensilage may be forced into the desired direction.

In carrying out the aim of our invention we provide a suitable elbow B which is secured to the delivery spout A of a suitable ensilage cutter of the blower type.

Adjacent the forward delivery end of the elbow B as is shown in Fig. 1 is positioned a supporting collar F provided with the supporting arms F' as shown in detail in Fig. 5. The arms F' are suitably secured to the elbow B as shown in Fig. 1 while the collar F is supported by means of a forward bracket K and the rear bracket K' so that this collar is securely held to the end of the spout. At suitable points this collar F is provided with a plurality of bearing rollers I which extend upward therefrom as is shown in Fig. 1 to engage the under surface of a suitable crown gear M from which crown gear extends a spout E. To hold this crown gear in engagement with the supporting rollers I we provide the pinions k meshing with said crown gear and suitably held within the brackets K and K' as shown.

The spout E is snugly guided upon the rollers l to prevent any lateral displacement, and at its forward end this spout is provided with a hinge N movably holding the nozzle T as shown. To adjustably hold this hinged nozzle we provide a crimped strap P which is engaged by the end of a stop spring O as shown in Fig. 1 so that this nozzle may be tilted to give an outward direction to the emptying ensilage.

Secured to the elbow B at two suitable points are the bearings J J shown in Figs. 1 and 2 which revolubly support the shaft X which is provided above with a gear G and below with a disk spiral H.

Extending upward from the elbow B is a suitable fan hood D and centrally held within this fan hood is a shaft Y provided with the gear g meshing with the gear G as shown more clearly in Fig. 2. This shaft Y is provided with a plurality of fan blades a partly extending into the path of the air blown ensilage the fan blades being shown in dotted line in Fig. 1 as extending partly into the elbow.

The operation of our device is as follows—The spout having been carried over a suitable silo the ensilage cutter is set in operation. As the blast driven ensilage is blown through the elbow the fan within the hood will be actuated to rotate the shaft Y imparting a rotary movement to the shaft X. The spiral-provided disk H is in engagement with the crown gear M the instrumentalities being so arranged that at one revolution of the disk spiral the crown gear M is advanced one tooth. Now as the crown gear is revolved the spout is also rotated but at a slow speed so that the ensilage is delivered in an annular heap. The direction of the ensilage may be easily changed in adjusting the nozzle T. It is of course understood that the ensilage is tamped down as it is delivered.

Having thus described our said invention what we claim as new is

1. An automatically operated delivery spout, comprising the combination with an elbow, of a suitably held supporting collar, a spout working within said supporting collar, a crown gear secured to said spout, said spout being held adjacent the delivery end of said elbow, a fan housing extending from said elbow, a fan within said housing, a gear secured to said fan and actuated thereby, a gear provided shaft meshing with said fan gear, a spiral-provided disk secured to the lower end of said gear shaft, said disk spiral meshing with said crown gear in the manner set forth.

2. The combination with the discharge spout of an ensilage cutter of the blower type, of a fan housing, a fan within said housing, a gear upon said fan, a suitably supported shaft, a gear upon said shaft meshing with aforesaid gear, a disk spiral at the lower end of said last mentioned shaft, a supporting collar secured to said spout, a delivery spout held by said supporting collar, a crown gear secured to said delivery spout meshing with said disk spiral, and an adjustable nozzle secured to said delivery spout.

In testimony whereof, we affix our signatures, in presence of two witnesses.

WILLIAM E. DRAPER.
FRANK W. STROHM.

Witnesses:
Thos. P. Campbell,
Warren D. Wheeler.